US012366095B2

(12) United States Patent
Reddmann et al.

(10) Patent No.: US 12,366,095 B2
(45) Date of Patent: Jul. 22, 2025

(54) MOTOR VEHICLE DOOR LOCK

(71) Applicant: Kiekert AG, Heiligenhaus (DE)

(72) Inventors: Uwe Reddmann, Essen (DE); Ulrich Weichsel, Duisburg (DE)

(73) Assignee: Kiekert AG, Heiligenhaus (DE)

( * ) Notice: Subject to any disclaimer, the term of this patent is extended or adjusted under 35 U.S.C. 154(b) by 405 days.

(21) Appl. No.: 17/785,947

(22) PCT Filed: Dec. 15, 2020

(86) PCT No.: PCT/DE2020/101066

§ 371 (c)(1),
(2) Date: Jul. 11, 2022

(87) PCT Pub. No.: WO2021/121481

PCT Pub. Date: Jun. 24, 2021

(65) Prior Publication Data

US 2023/0028720 A1 Jan. 26, 2023

(30) Foreign Application Priority Data

Dec. 20, 2019 (DE) ..................... 10 2019 135 418.8

(51) Int. Cl.
*E05B 81/16* (2014.01)
*E05B 81/22* (2014.01)
(Continued)

(52) U.S. Cl.
CPC .............. *E05B 81/16* (2013.01); *E05B 81/22* (2013.01); *E05B 81/30* (2013.01)

(58) Field of Classification Search
CPC .......... E05B 81/16; E05B 81/20; E05B 81/22; E05B 81/30; E05B 81/34; E05B 81/06; E05B 81/14; E05B 81/12; E05B 81/18
See application file for complete search history.

(56) References Cited

U.S. PATENT DOCUMENTS 4,927,204 A * 5/1990 Asada ...................... E05B 81/20 292/216
5,769,468 A * 6/1998 Armbruster ............. E05B 81/20 292/201
(Continued)

FOREIGN PATENT DOCUMENTS

DE 19530728 A1 2/1997
DE 19700887 A1 7/1998
(Continued)

OTHER PUBLICATIONS

First Office Action, Chinese Patent Appl. No. 202080089975.X, dated May 5, 2023 (translated); 6 pages. (Year: 2023).*
(Continued)

*Primary Examiner* — Kristina R Fulton
*Assistant Examiner* — Emily G. Brown
(74) *Attorney, Agent, or Firm* — Renner, Otto, Boisselle & Sklar, LLP

(57) ABSTRACT

A motor vehicle door lock which is equipped with a motor vehicle lock having a locking mechanism that is mounted in a lock case and consists substantially of a rotary latch and a locking pawl. Furthermore, a lock striker that interacts with the locking mechanism is provided, as well as an opener that engages the lock striker during an opening process of an associated motor vehicle door. The opener is acted upon by means of an opening device, at least part of which is integrated in the motor vehicle lock. According to the invention, the opening device is also designed to lift the locking pawl off the rotary latch.

10 Claims, 5 Drawing Sheets

(51) Int. Cl.

| | |
|---|---|
| ***E05B 81/30*** | (2014.01) |
| *E05B 81/34* | (2014.01) |

(56) References Cited

U.S. PATENT DOCUMENTS

| | | | | |
|---|---|---|---|---|
| 2004/0046409 | A1* | 3/2004 | Hirai | E05B 83/16 296/76 |
| 2006/0290142 | A1* | 12/2006 | Tani | E05B 81/14 292/201 |
| 2012/0161456 | A1* | 6/2012 | Riedmayr | E05B 83/24 292/226 |
| 2017/0191291 | A1* | 7/2017 | Scholz | E05B 81/34 |
| 2017/0253281 | A1 | 9/2017 | Kwak et al. | |
| 2017/0254123 | A1 | 9/2017 | Kwak et al. | |
| 2018/0230718 | A1* | 8/2018 | Menke | E05B 15/022 |
| 2019/0003214 | A1* | 1/2019 | Cumbo | E05B 81/25 |
| 2019/0226247 | A1* | 7/2019 | Johann | E05B 81/20 |

FOREIGN PATENT DOCUMENTS

| | | | | |
|---|---|---|---|---|
| DE | 10004242 | A1 | 8/2000 | |
| DE | 20016292 | U1 | 12/2000 | |
| DE | 10327448 | A1 * | 1/2005 | E05B 81/20 |
| DE | 102014119382 | A1 | 6/2016 | |
| DE | 102015003918 | A1 | 9/2016 | |
| DE | 102016117282 | A1 * | 3/2018 | E05B 77/16 |
| WO | WO-2015139678 | A1 * | 9/2015 | E05B 81/20 |

OTHER PUBLICATIONS

International Search Report mailed Apr. 15, 2021, for priority International Patent Application No. PCT/DE2020/101066.

* cited by examiner

MOTOR VEHICLE DOOR LOCK

This application is a national phase of International Patent Application No. PCT/DE2020/101066 filed Dec. 15, 2020, which claims priority to German Patent Application No. 10 2019 135 418.8 filed Dec. 20, 2019, each of which is hereby incorporated herein by reference in its entirety.

FIELD OF DISCLOSURE

The invention relates to a motor vehicle door lock, with a motor vehicle lock having a locking mechanism that is mounted in a lock case and consists substantially of a rotary latch and a locking pawl, furthermore with a lock striker that interacts with the locking mechanism, as well as an opener that engages the lock striker during an opening process of an associated motor vehicle door, wherein the opener is acted upon by means of an opening device, at least part of which is integrated in the motor vehicle door lock.

BACKGROUND OF DISCLOSURE

As is known, a motor vehicle door lock consists of the essential structural features of a motor vehicle lock on the one hand and a lock striker on the other. The motor vehicle lock is usually attached to or in the associated motor vehicle door. In contrast, the lock striker is situated on the body. In general, however, it is also possible to proceed in reverse.

Due to aerodynamic requirements, efforts are now being made to make motor vehicle doors particularly tight-closing and at the same time, if possible, without an outside door handle or with a recessed outside door handle. If there is no outside door handle, the design is often such that the motor vehicle lock that locks the motor vehicle door to the motor vehicle body is opened and then, with the aid of the opener and the associated opening device, is opened at least far enough for an operator to reach into a gap between the motor vehicle door and the motor vehicle body and thus the motor vehicle door swings open. This means that the opener, including the opening device, usually ensures that when the motor vehicle door is opened, the gap between said motor vehicle door and the motor vehicle body is usually large enough for an operator to manually open the associated motor vehicle door through this gap. This is a proven approach.

Such an opener, including the opening device, which acts on the motor vehicle door is described in accordance with the generic type in DE 10 2015 003 918 A1, which can be traced back to the applicant. For this purpose, the known opener works on a locking bolt and is subjected to the necessary force by means of an opening means. The opening means can be an electric motor. In addition, the opening device is integrated in the motor vehicle lock. In this way, the motor vehicle door is to be brought into a defined position in order to avoid damage or incorrect operation.

The further state of the art according to DE 100 04 242 A1 concerns a locking device for tailgates, which is equipped with a locking part that can be fixed to the body. After the tailgate has reached a gap-open position, the locking part moves into a hidden position and is returned to a catch position before the tailgate is closed. This is intended to provide better operation of the tailgate.

Finally, utility model DE 200 16 292 U1, which must also be considered as the state of the art, relates to a motor vehicle door lock in which the rotary latch can be transferred with the aid of a locking pawl drive into a lifting position that opens the associated motor vehicle door, with the formation of a gap. For this purpose, the locking pawl and the rotary latch are connected to one another with the aid of the locking pawl drive via a rigid connecting lever and forced guidance is achieved at least in the lifting position. As a result, a perfect and sufficient formation of a gap between the motor vehicle door and the motor vehicle body is to be made available under all circumstances.

The state of the art has proven itself in principle, but there is still room for improvement. The operation of the opener with the aid of the opening device during an opening process presupposes that the locking mechanism has been opened beforehand. For this purpose, the procedure is usually and in practice such that the locking pawl is lifted by a motor from its engagement with the rotary latch. A mechanical operation of the locking pawl and a corresponding mechanical lifting process are also conceivable. Overall, this leads to a solution that is relatively complex in terms of construction, especially since the actuation of the locking pawl on the one hand and of the opener with the opening device on the other hand are carried out independently of one another. This is where the invention starts from.

SUMMARY OF DISCLOSURE

The invention is based on the technical problem of further developing such a motor vehicle door lock in such a way that the overall design effort is reduced.

To solve this technical problem, a generic motor vehicle door lock within the scope of the invention is characterized in that the opening device, at least part of which is integrated in the motor vehicle door lock, is also designed to lift the locking pawl from the rotary latch.

In the context of the invention, the process of opening the locking mechanism and the opening process are practically combined and linked with one another. This is ensured by the opening device, which not only acts on the opener gripping the lock striker during an opening process of the associated motor vehicle door, but is also designed within the scope of the invention to lift the locking pawl from the rotary latch. The invention is based on the finding that the two specified processes, on the one hand the lifting of the locking pawl and on the other hand the opening process, must be carried out consecutively, so that in principle one and the same device, according to the invention the opening device, can be used for this purpose. The consequence of this is that a structurally particularly simple and cost-effective approach is pursued and implemented. Herein lie the essential advantages.

Within the scope of an advantageous embodiment, the opening device has at least one actuator and/or a spring. In one variant, the procedure can be such that the opening device is pretensioned in the direction of the lock striker. The pretensioning realized at this point can be provided with the aid of the spring that is tensioned during the closing process of a motor vehicle door. In order to now realize the opening process, the procedure is generally such that the pretensioned opening device is unlocked with the aid of a ratchet pawl that is operable by the actuator.

This means that in this case, the actuator works as part of the opening device on the latch and ensures its operation. The ratchet pawl keeps the opening device in its pretensioned state. This pretensioned state of the opening device is assumed immediately when the motor vehicle door is closed and, in this way, ensures the desired pretensioning in that the aforementioned spring is pretensioned to act on the opening device. In order to start the opening process, it is only necessary for the spring to relax and the opening device or the opener engaging the lock striker to be able to act accordingly. The relaxation of the opening device is initiated with the aid of the ratchet pawl that is operable by the actuator.

The opening device usually has at least one operating lever. This operating lever is typically mounted in the lock case, so that for this reason alone the opening device is integrated at least in part in the motor vehicle lock. The operating lever can now advantageously be designed both for lifting the locking pawl from the rotary latch and for acting on the opener. As a result, a structurally particularly simple and compact design with cost advantages is realized.

In addition, the opening device usually has a drive lever that can be acted upon by the actuator and/or the aforementioned spring. This means that the drive lever, in conjunction with the associated spring, can ensure that the opening device is transferred to its pretensioned state, in particular when the associated motor vehicle door is closed, as was already explained in the introduction. Alternatively or additionally, the drive lever in question can also be acted upon with the aid of the actuator, in order in this way to act on the aforementioned operating lever in order to first lift the locking pawl from the rotary latch and then to act on the opener. This means that the drive lever in turn acts on the said operating lever and/or the opener. The latter variant corresponds to the fact that the operating lever is not implemented, but rather the drive lever, which can be acted upon with the aid of the spring and/or the actuator, acts directly on the opener during an opening process. In this case, the drive lever in question may additionally be designed to lift the locking pawl from its engagement with the rotary latch beforehand. In principle, this can also be carried out with the aid of the opener before said opener moves against the lock striker in order to be able to open the associated motor vehicle door.

The opener as such is usually connected to the drive lever. As an alternative or in addition, however, the opener can also usually act directly with the actuator. In the latter case, the actuator may engage in a toothing of the opener with a gearwheel on the output side. Since the opener is connected to the drive lever, the opening force required for this purpose can be transmitted directly to the lock striker via the opener in this way during an opening process.

If the opener is connected to the drive lever and not directly to the actuator, the design is usually such that the opener is moved against the lock striker with the aid of the drive. For this purpose, the opener may have a corresponding contour that engages with the lock striker.

As a result, a motor vehicle door lock is provided whose motor vehicle lock is equipped with an opening device that is integrated at least in part in the motor vehicle lock. As a rule, the operating lever—if present—and usually also the drive lever are mounted in or on the lock case for this purpose. In contrast, the actuator that is typically additionally provided, or alternatively the aforementioned spring, is usually placed locally and separately from the motor vehicle lock. Conventional transmission means, such as an actuating rod, a Bowden cable, etc., can be used to transmit force from the spring or the actuator to the drive lever. Direct action on the drive lever with the aid of the actuator is of course also possible. The invention even opens up the more far-reaching possibility of directly acting on the opener with the aid of the actuator. The opener is then usually connected directly to the lock striker.

In any case, according to the invention, the opening device is not only acted upon in the course of the opening process, but is also designed to lift the locking pawl from the rotary latch. Within the scope of the invention, the opening device therefore has a dual function in that it ensures the actual opening process of the motor vehicle door in relation to the motor vehicle body. In addition, the opening device according to the invention ensures that the locking pawl has been lifted from the rotary latch beforehand, so that the lock striker caught by the rotary latch when the locking mechanism is in the closed state is released and the opener can grip the lock striker in order to be able to open the motor vehicle door in relation to the motor vehicle body.

In order to be able to realize and implement this additional function of the opening device for lifting the locking pawl from the rotary latch, there are various possibilities within the scope of the invention. The opening device can be equipped with the operating lever, which in turn is acted upon by the actuator directly or via the drive lever. The operating lever mounted in the lock case can now initially lift the locking pawl from the rotary latch and then serves to act on the opener. This is usually and according to a particularly preferred variant how the procedure is carried out.

However, there is also the possibility that the opener or the drive lever itself first lifts the locking pawl from the rotary latch and only then initiates the opening process. A further advantageous variant provides that the ratchet pawl, which is operable by the actuator, first lifts the locking pawl from its engagement with the rotary latch and only then releases the opening device, which is pretensioned in this case, so that the previously tensioned spring can relax and thereby move the opener against the lock striker in order to open the motor vehicle door. Either way, a particularly compact embodiment with synergetic advantages is provided, resulting in additional cost advantages. Herein lie the essential advantages.

BRIEF DESCRIPTION OF DRAWINGS

The invention is explained in greater detail below with reference to a variant which shows only one exemplary embodiment. In the drawings.

DETAILED DESCRIPTION

Figure 1:
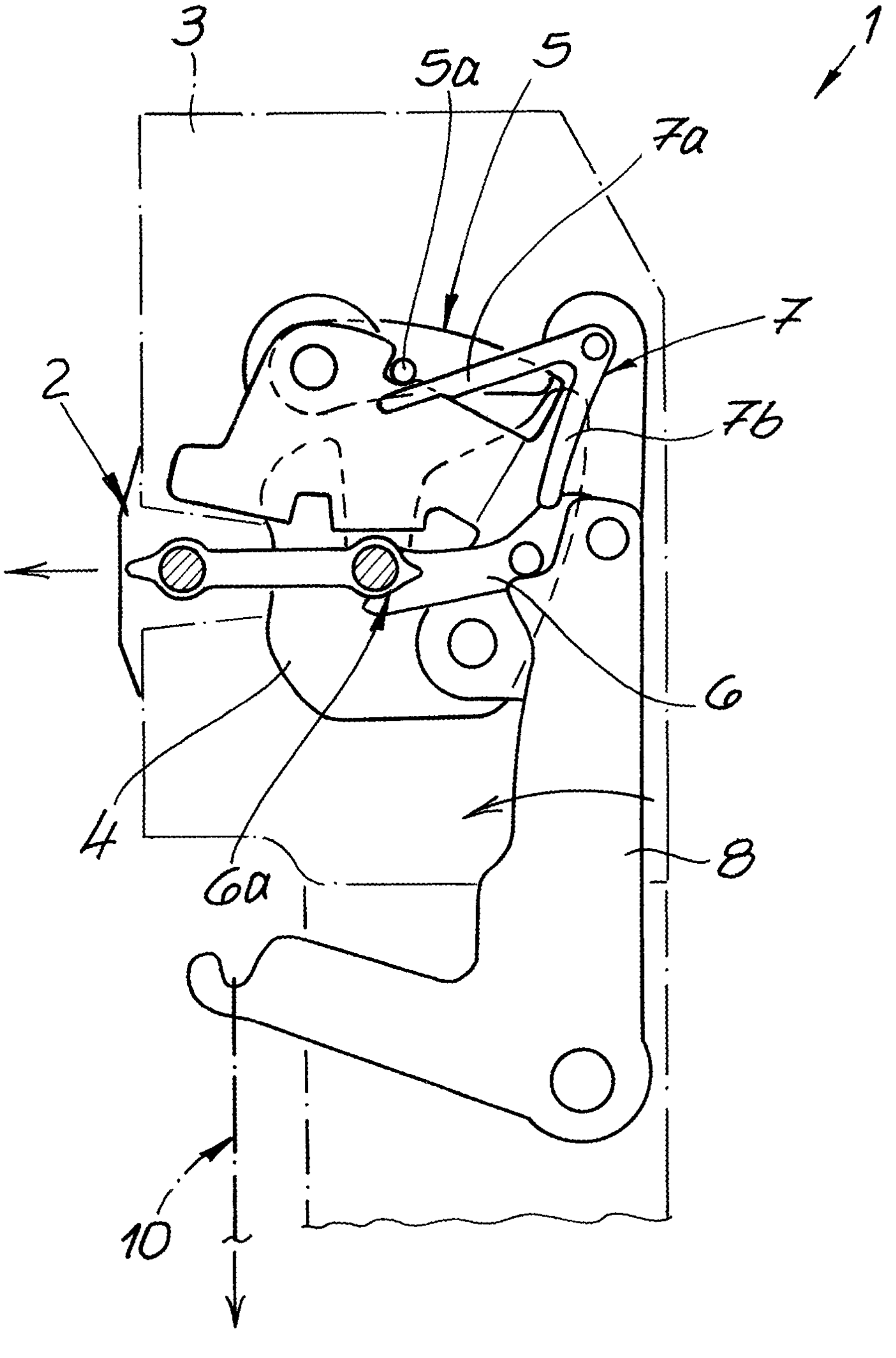
FIG. 1 shows the motor vehicle door lock according to the invention in a first and particularly preferred variant.

The drawings show a motor vehicle door lock, which consists of the essential structural features of a motor vehicle lock 1 on the one hand and a lock striker 2 on the other. The motor vehicle lock 1 can be mounted in or on a motor vehicle door, not shown in detail. In contrast, according to the embodiment, the lock striker 2 is situated on the body. A reverse arrangement of the lock striker 2 on the motor vehicle door and of the motor vehicle lock 1 on the body is conceivable, but not shown.

The motor vehicle lock 1 is equipped with a locking mechanism 4, 5 consisting of a rotary latch 4 and a locking pawl 5 mounted in a lock case 3. Other components of the motor vehicle lock 1 that are also mostly mandatory, such as an operating and locking lever system, are not shown for reasons of clarity.

The locking mechanism 4, 5 interacts with the aforementioned lock striker 2. In the four different embodiments according to FIGS. 1 to 4, the motor vehicle lock 1 is shown in its closed state, which corresponds to the lock striker 2 being caught by the locking mechanism 4, 5.

The basic structure then includes an opener 6 and an opening device 7, 8, 9, 10, 11. The opening device 7, 8, 9, 10, 11 is integrated at least in part in the motor vehicle lock 1 according to the exemplary embodiment. This is explained in more detail below. With the aid of the opening device 7, 8, 9, 10, 11, the opener 6 engaging the lock striker 2 during an opening process of the motor vehicle door (not shown) is acted upon. According to the invention, the opening device 7, 8, 9, 10, 11 is additionally designed to lift the locking pawl 5 from the rotary latch 4 (in the closed state of the locking mechanism 4, 5 with the lock striker 2 caught).

In detail, the opening device 7, 8, 9, 10, 11 is initially equipped with an actuator 10. According to the exemplary embodiment in FIGS. 1, 2 and 4, the actuator 10 works on a drive lever 8 (FIGS. 1 and 2) or directly on the opener 6 (cf. FIG. 4). In the exemplary embodiment according to FIG. 3, on the other hand, the actuator 10 acts on a ratchet pawl 9. In this case, the drive lever 8, which is also implemented there, is not acted upon by the actuator 10, but rather by a spring 11.

In addition, the opening device 7, 8, 9, 10, 11 also has an operating lever 7, as is provided in the particularly preferred exemplary embodiment according to FIG. 1. The operating lever 7 is mounted in the lock case 3 and is rotatably connected at one end to the opener 6 or the drive lever 8. That means that the opening device 7, 8, 9, 10, 11 comprises the operating lever 7, the drive lever 8, the ratchet pawl 9, the actuator 10 and finally the spring 11, wherein, depending on the exemplary embodiment, selected individual components or all components are used, as will be explained in more detail below. The overall design is such that the opening device 7, 8, 9, 10, 11 acts on the opener 6 when the motor vehicle door equipped with the motor vehicle door lock 1 is opened. In addition, the opening device 7, 8, 9, 10, 11 ensures according to the invention that, before the opening process, the locking pawl 5 is first lifted from its engagement with the rotary latch 4, so that, starting from the closed state shown in each case, the lock striker 2 is released and consequently the motor vehicle door can be opened.

As already explained, the exemplary embodiment according to FIG. 1 comprises the operating lever 7 which is mounted in the lock case 3. The drive lever 8, which is used in the first three exemplary embodiments, is also mounted in or on the lock case. The actuator 10 works on the drive lever 8 in the variant according to FIGS. 1 and 2. This can take place directly or indirectly. If the actuator 10 acts on the drive lever 8 indirectly, a transmission means that is not expressly shown may be interposed, which is designed, for example, as a rod or Bowden cable. In the variant according to FIG. 4, on the other hand, the drive lever 8 is not necessary because in this case the actuator 10 comprises an output-side pinion, which in this case engages in a toothing on the opener 6 for the opening process. The opener 6 is connected to the lock striker 2 in this case. As a result, a rotational movement of the output shaft of the actuator 10 with the pinion provided there can be converted directly into a linear movement of the lock striker 2, so that the desired opening process is carried out as a result.

If, in the exemplary embodiment according to FIG. 1, the actuator 10 uses the pulling movement shown there to ensure that the operating lever 8 is pivoted counterclockwise about its axis mounted in the lock case 3, this first of all ensures that the V-shaped, two-armed operating lever 7 moves with its locking pawl arm 7_a_ against a pin 5_a_ on the locking pawl 5. As a result, the locking pawl 5 is pivoted counterclockwise about its axis and releases the rotary latch 4 and thus the lock striker 2. For this purpose, the operating lever 7 is connected with its connection arm 7_b_ in a pivoting manner to the drive lever 8 or to the opener 6, which is also connected in an articulated manner to the drive lever 8. The further counterclockwise rotation of the drive lever 8 with the aid of the actuator 10 now causes the opener 6 to move against the lock striker 2 and this results in a relative movement between the motor vehicle lock 1 and the lock striker 2. The result of this is that the motor vehicle door supporting the motor vehicle lock 1 is opened as desired in relation to the lock striker 2 connected to the body. For this purpose, the opener 6 has a front contour 6_a_, which is adapted to a bracket of the lock striker 2.

Figure 2:
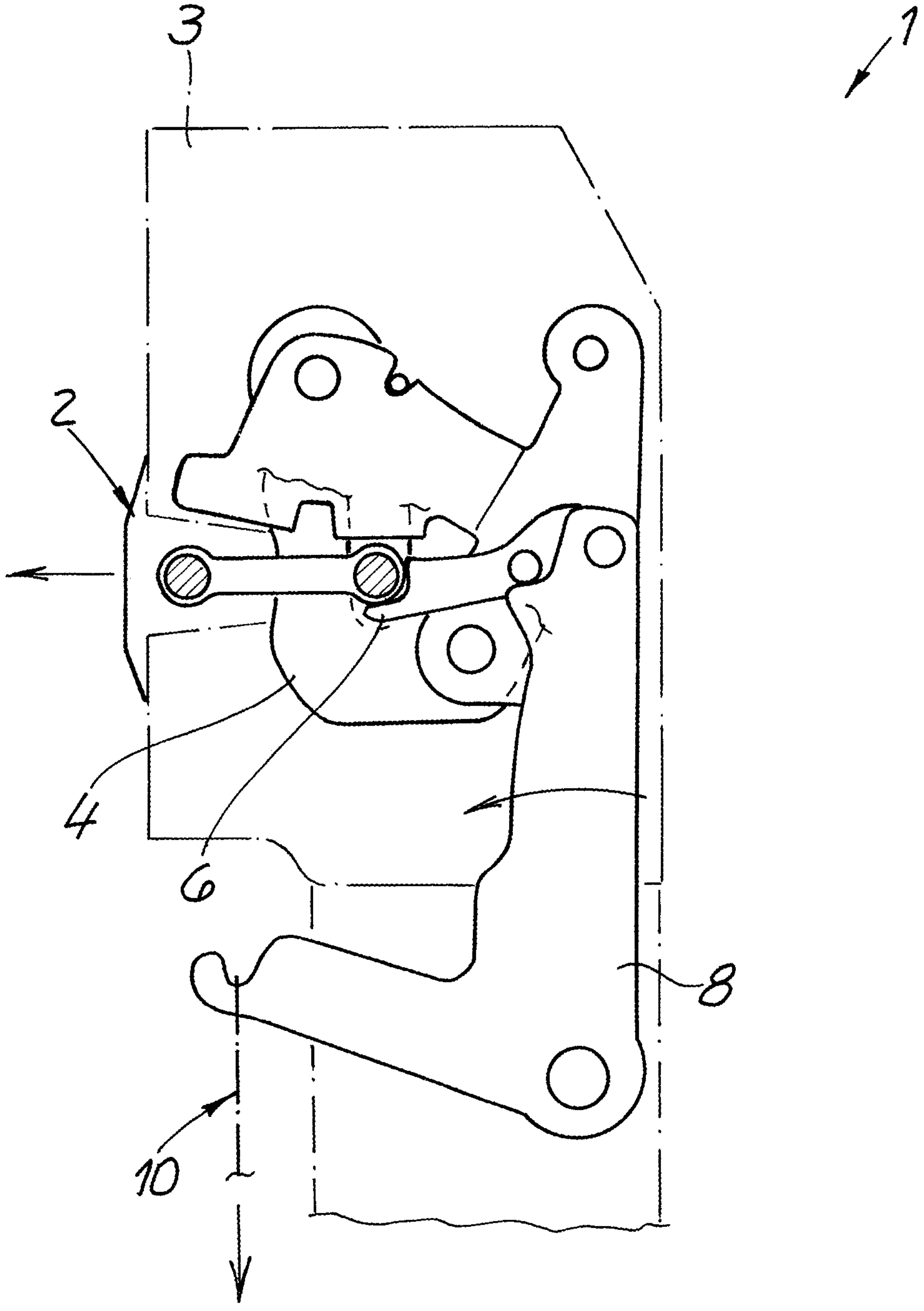
FIG. 2 shows a modified second embodiment.

The exemplary embodiment according to FIG. 2 substantially corresponds to that of FIG. 1, except for the missing operating lever 7. In this case, the drive lever 8 or the opener 6 actually ensures that the locking pawl 5 is lifted from its engagement with the rotary latch 4 in the opening process shown. For this purpose, the drive lever 8 is again acted upon in a counterclockwise direction with the aid of the actuator 10. The anticlockwise rotation of the drive lever 8 again and again causes the locking pawl 5 to be lifted from its engagement with the rotary latch 4 via the drive lever 8 or the opener 6. Only then does the opener 6 work in a manner comparable to the exemplary embodiment according to FIG. 1 on the then-released lock striker, so that the motor vehicle door is opened as desired in relation to the motor vehicle body.

Figure 3:
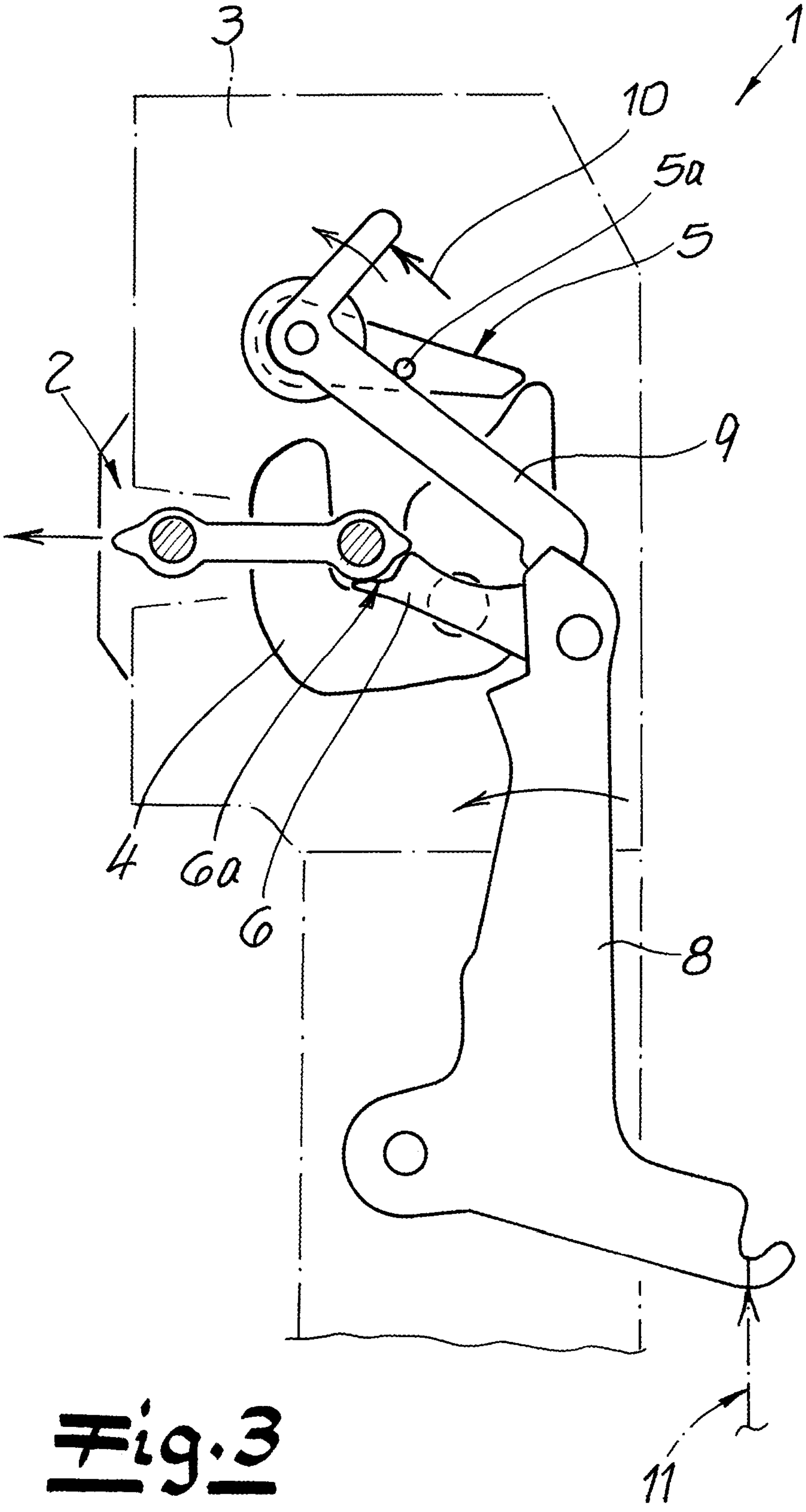
FIG. 3 shows a further third variant.

FIG. 3 shows a variant in which the drive lever 8 is not acted upon with the aid of the electromotive actuator 10, but rather with the aid of the spring 11. In principle, of course, in the previously discussed exemplary embodiments according to FIGS. 1 and 2, the aforementioned spring 11 rather than the actuator 10 can be used to act on the drive lever 8, but this is not shown. In the exemplary embodiment according to FIG. 3, the actuator 10 does not interact with the drive lever 8, but rather with the ratchet pawl 9. The ratchet pawl 9, like the drive lever 8 and also the operating lever 7, is again mounted in the lock case 3, so that the at least partial integration of the opening device 7, 8, 9, 10, 11 in the motor vehicle lock 1 is explained.

In this case (FIG. 3), the design is such that the opening device 7, 8, 9, 10, 11 is pretensioned in the direction of the lock striker 2. The spring 11 provides the pretensioning. The design is such that the spring 11 in question is tensioned during a closing process of the locking mechanism 4, 5 and accordingly when the lock striker 2 moves into the locking mechanism 4, 5. During this closing process and also thereafter, the spring 11 retains its tension as long as the locking mechanism 4, 5 maintains the closed state shown in FIG. 3. This is ensured by the ratchet pawl 9, which holds the drive lever 8 in the position shown with the tensioned spring 11. The opening device 7, 8, 9, 10, 11 pretensioned in this way can now be released with the aid of the ratchet pawl 9 that is operable by the actuator 10. All that is required for this is that the actuator 10 acts on the ratchet pawl 9 in the direction of the arrow indicated in FIG. 3, so that the ratchet pawl 9 performs a counterclockwise movement. As a result of this counterclockwise movement of the ratchet pawl 9, the drive lever 8 is released and can in turn pivot counterclockwise in order in this way to act on the opener 6, which is pivotally connected to the drive lever 8, with the aid of the spring 11, which as a result moves with its front contour 6_a_ against the lock striker 2 and ensures the desired opening process.

Figure 4:
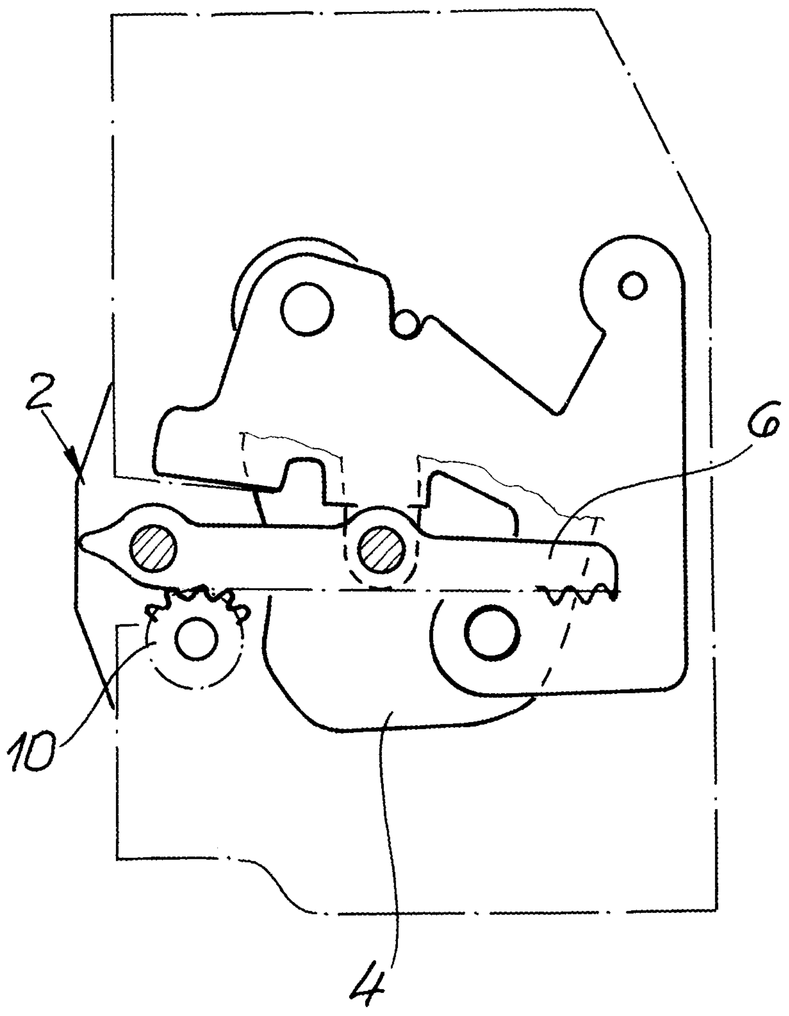
FIG. 4 shows a further fourth embodiment.

The exemplary embodiment according to FIG. 4 is distinguished in that in this case neither the drive lever 8 nor the operating lever 7 is implemented. Rather, the present actuator 10 is practically integrated in the motor vehicle lock 1, specifically it engages with a pinion mounted on its output shaft directly into a toothing on the underside of the opener 6, which in turn is firmly connected to the lock striker 2. Rotational movements of the pinion of the actuator 10 on the output side now in turn lead to the desired opening process.

All of the exemplary embodiments make it clear that the opening device 7, 8, 9, 10, 11 has a drive lever 8 that can be acted upon by the actuator 10 and/or the spring 11. The drive lever 8 in turn acts on the operating lever 7 in the variant according to FIG. 1 and/or directly on the opener 6 in the exemplary embodiments of FIGS. 2 and 3. In this case, the opener 6 is either connected to the drive lever 8, as the embodiment variants according to FIGS. 1 to 3 make clear, or it can also interact directly with the actuator 10, as the exemplary embodiment in FIG. 4 shows. Either way, the opener 6 is moved against the lock striker 2 with the aid of the opening device 7, 8, 9, 10, 11. The actuator 10 or the spring 11 or both can ensure this.

Figure 5:
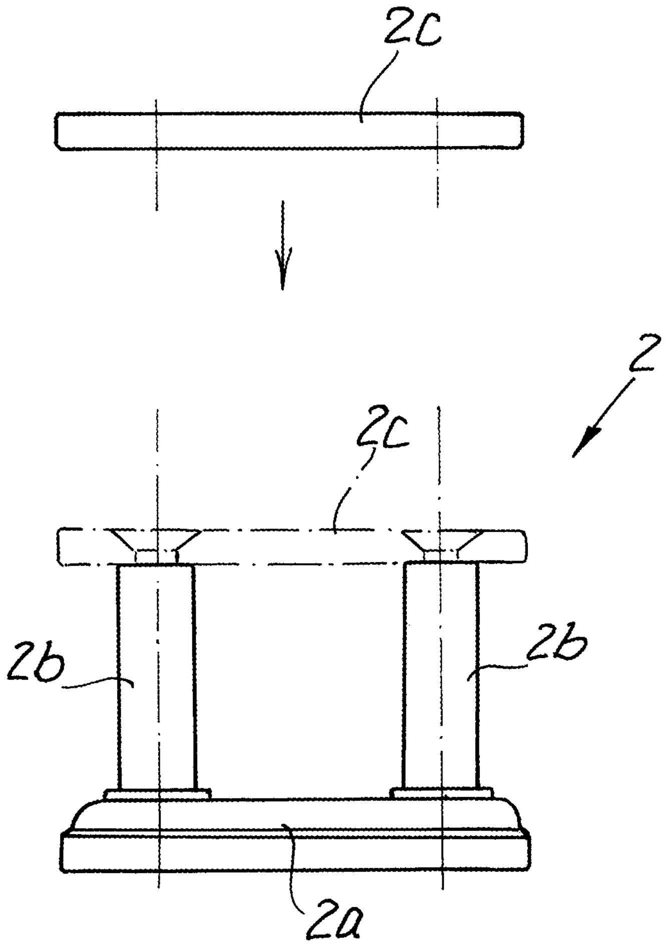
FIG. 5 shows the lock striker in detail.

In the context of FIG. 5, it finally becomes clear that the lock striker 2 is composed of a base plate 2*a* and two stepped mandrels 2*b* connected to the base plate 2*a*. The stepped mandrels 2*b* are connected to one another with a head-side plate 2*c*, the two stepped mandrels 2*b* and the plate 2*c* being coupled to one another via a riveting process. Of course, this only applies as an example, because at this point it is also possible to work with a lock striker 2 bent entirely from a wire.

REFERENCE SIGNS

1 Motor vehicle lock
2 Lock striker
2*a* Base plate
2*b* Step mandrels
2*c* Head-side plate
3 Lock case
4 Rotary latch
5 Locking pawl
5*a* Pin
6 Opener
6*a* Front contour
7 Operating lever
7*a* Locking pawl arm
7*b* Connection arm
8 Drive lever
9 Ratchet pawl
10 Actuator
11 Spring

The invention claimed is:

1. A motor vehicle door lock comprising:
a locking mechanism that is mounted in a lock case and that includes a rotary latch and a locking pawl,
a lock striker that interacts with the locking mechanism,
an opener that engages the lock striker during an opening process of an associated motor vehicle door, and
an opening device, wherein the opener is acted upon by the opening device, wherein the opening device also lifts the locking pawl from the rotary latch,
wherein the opening device is configured such that from a closed position of the locking mechanism, the opening device lifts the locking pawl from the rotary latch such that the lock striker is released before the opening device acts on the opener to move the lock striker in an opening direction,
wherein the opening device is configured such that the opening device lifting the locking pawl from the rotary latch and the opening device acting on the opener to move the lock striker in an opening direction are carried out consecutively,
wherein the opening device comprises at least one of an actuator and a spring,
wherein the opening device comprises a drive lever that is acted upon by the actuator and/or the spring, and
further comprising an operating lever that has two arms including a first arm that interacts against a pin of the locking pawl and a second arm that is connected in a pivoting manner to the drive lever.

2. The motor vehicle door lock according to claim 1, wherein the drive lever is pretensioned in a direction of the lock striker by the spring.

3. The motor vehicle door lock according to claim 2, wherein the opening device further comprises a ratchet lever which holds the drive lever in the pretensioned position, wherein the pretensioned drive lever is unlocked with aid of the ratchet lever being operated by an actuator.

4. The motor vehicle door lock according to claim 1, wherein the operating lever is mounted in the lock case.

5. The motor vehicle door lock according to claim 1, wherein the operating lever both lifts the locking pawl from the rotary latch and acts on the opener.

6. The motor vehicle door lock according to claim 1, wherein the drive lever in turn acts on the operating lever and/or the opener.

7. The motor vehicle door lock according to claim 1, wherein the opener is connected to the drive lever.

8. The motor vehicle door lock according to claim 7, wherein the opener has a contour that engages with the lock striker.

9. The motor vehicle door lock according to claim 1, wherein the opener interacts directly with the actuator.

10. The motor vehicle door lock according to claim 9, wherein the actuator engages toothing on the opener.

* * * * *